(12) United States Patent
Naughton et al.

(10) Patent No.: US 10,193,638 B2
(45) Date of Patent: Jan. 29, 2019

(54) WIRELESS COMMUNICATION SYSTEM VIA NANOSCALE PLASMONIC ANTENNAS

(71) Applicants: Michael J. Naughton, Chestnut Hill, MA (US); Juan M. Merlo-Ramirez, Brighton, MA (US)

(72) Inventors: Michael J. Naughton, Chestnut Hill, MA (US); Juan M. Merlo-Ramirez, Brighton, MA (US)

(73) Assignee: The Trustees of Boston College, Chestnut Hill, MA (US)

( * ) Notice: Subject to any disclaimer, the term of this patent is extended or adjusted under 35 U.S.C. 154(b) by 0 days.

(21) Appl. No.: 15/722,807

(22) Filed: Oct. 2, 2017

(65) Prior Publication Data
US 2018/0097570 A1     Apr. 5, 2018

Related U.S. Application Data

(60) Provisional application No. 62/401,948, filed on Sep. 30, 2016.

(51) Int. Cl.
| | |
|---|---|
| *G05B 5/00* | (2006.01) |
| *B82Y 20/00* | (2011.01) |
| *H04B 10/90* | (2013.01) |
| *H04B 10/70* | (2013.01) |
| *H04B 10/11* | (2013.01) |
| *G02B 5/00* | (2006.01) |

(52) U.S. Cl.
CPC .............. *H04B 10/70* (2013.01); *B82Y 20/00* (2013.01); *G02B 5/008* (2013.01); *H04B 10/11* (2013.01); *H04B 10/90* (2013.01)

(58) Field of Classification Search
None
See application file for complete search history.

(56) References Cited

U.S. PATENT DOCUMENTS

| | | | |
|---|---|---|---|
| 9,397,758 B2* | 7/2016 | Akyildiz | ................ H04B 10/90 |
| 9,583,650 B1* | 2/2017 | Yu | ........................ H01L 31/0232 |
| 9,772,448 B2* | 9/2017 | Avouris | ............... G02B 6/1226 |
| 9,825,712 B2* | 11/2017 | Akyildiz | ................ H04B 10/90 |
| 2016/0254398 A1* | 9/2016 | Echtermeyer | .......... B82Y 30/00 257/432 |
| 2018/0097570 A1* | 4/2018 | Naughton | .............. H04B 10/70 |

OTHER PUBLICATIONS

Juan M. Merlo, Nathan T. Nesbitt, Yitzi M. Calm, Aaron H. Rose, Luke D'Imperio, Chaobin Yang, Jeffrey R. Naughton, Michael J. Burns, Krzysztof Kempa & Michael J. Naughton. "Wireless communication system via nanoscale plasmonic antennas," Scientific Reports vol. 6, Article No. 31710 (2016).*

(Continued)

*Primary Examiner* — Rhonda S Peace
(74) *Attorney, Agent, or Firm* — Bond, Schoeneck & King, PLLC; Joseph Noto

(57) ABSTRACT

A nanoscale wireless communication system and device operates via in-plane information transmission between a broadcast plasmonic antenna and a receiver plasmonic antenna which mediates a three-step conversion process (surface plasmon→photon→surface plasmon) with in-plane and in-phase efficiency (plasmon→plasmon) in the free-space excitation wavelength for antenna separations in the far-field.

16 Claims, 19 Drawing Sheets

(56) References Cited

OTHER PUBLICATIONS

Gaetano Bellanca, Giovanna Calò, Ali Emre Kaplan, Paolo Bassi, and Vincenzo Petruzzelli, "Integrated Vivaldi plasmonic antenna for wireless on-chip optical communications," Opt. Express 25, 16214-16227 (2017).*

Nafari, Mona & Jornet, Josep. "Metallic Plasmonic Nano-antenna for Wireless Optical Communication in Intra-body Nanonetworks," EAI Endorsed Transactions on Cognitive Communications, 2015. 2. 10.4108/eai.28/9/2015.2261410.*

M. Nafari and J. M. Jornet, "Modeling and Performance Analysis of Metallic Plasmonic Nano-Antennas for Wireless Optical Communication in Nanonetworks," in IEEE Access, vol. 5, pp. 6389-6398, 2017. doi: 10.1109/ACCESS.2017.2690990.*

\* cited by examiner

FIG. 4A
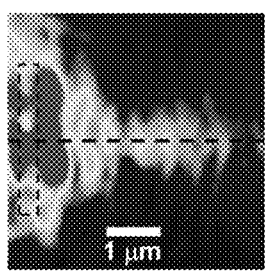
FIG. 4B
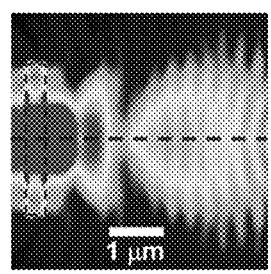
FIG. 4C
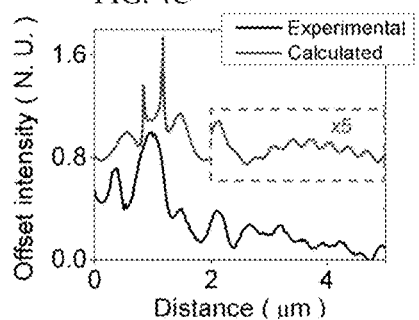
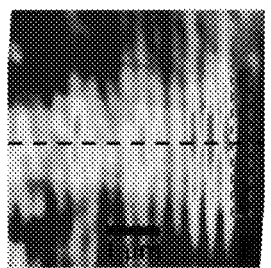
FIG. 4D
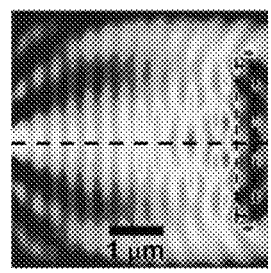
FIG. 4E
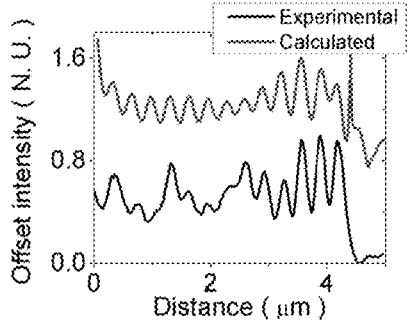
FIG. 4F

WIRELESS COMMUNICATION SYSTEM VIA NANOSCALE PLASMONIC ANTENNAS

CROSS REFERENCE

This application claims the benefit of the filing date of U.S. Provisional Patent Application Ser. No. 62/401,948, filed Sep. 30, 2016, which is hereby incorporated by reference in its entirety.

FIELD

The present invention is directed to a wireless communication system via nanoscale plasmonic antennas.

BACKGROUND

In-plane wireless communication systems are currently being developed to be compatible with modern on-chip technology. Some of the advantages that in-plane wireless communication offers are lower loss and reduction in the number of required waveguides. Most modern on-chip optical technologies use near-infrared wavelengths, but for visible wavelengths, an ideal candidate to perform in-plane communication is the surface plasmon (SP), i.e. the collective oscillation of electrons coupled to an electromagnetic field at a dielectric-metal interface. SPs have the capability to highly confine energy on the interface where they propagate, including to subwavelength scales. An additional property of SPs is their capability to be strongly confined to the surface of metallic structures having subwavelength dimensions, including implementations called plasmonic antennas (PAs). Specially designed PAs can collect free-space radiation (photons) and convert it into propagating surface plasmons (SPs) by a momentum up-conversion process (k-UC). Conversely, PAs can perform a momentum down-conversion process (k-DC) by converting SPs into photons. Several reports have appeared using PAs as receivers or broadcasters of electromagnetic radiation. One limitation of the systems in these reports is that the free-space radiation is emitted predominantly out-of-plane, and little effort has been done to facilitate in-plane emission and collection, i.e., in the direction of the SP propagation. Such an in-plane communication concept could be a significant advancement in on-chip photonic technology, due to better impedance matching between the emitted and received radiation.

SUMMARY

In accordance with one aspect of the present invention, there is provided a nanoscale wireless communication system including: an energy source; and a device including: a planar substrate, a broadcast plasmonic antenna on a surface of the substrate and including a planar plasmonic material including a planar emitter region and a broadcast antenna arm, a receiver plasmonic antenna on the surface of the substrate and including the planar plasmonic material including a planar receiver region and a receiver antenna arm, a dielectric-cavity in the substrate extending from below at least a portion the emitter region to below at least a portion of the receiver region, and the broadcast antenna arm extending from the emitter region over the dielectric-cavity and the receiver antenna arm extending from the receiver region over the dielectric-cavity, wherein the broadcast plasmonic antenna propagates a selected wavelength of surface plasmons converted from the energy source across the broadcast region which generate a symmetric charge distribution from the top to bottom surface of the broadcast antenna arm edge and decay into photons that are transmitted in-plane and in-phase through a dielectric medium to the receiver plasmonic antenna in the far field where the photons excite surface plasmons in the receiver region.

In accordance with another aspect of the present invention, there is provided a nanoscale wireless communication device including: a planar substrate, a broadcast plasmonic antenna on a surface of the substrate and including a planar plasmonic material including a planar emitter region and a broadcast antenna arm, a receiver plasmonic antenna on the surface of the substrate and including the planar plasmonic material including a planar receiver region and a receiver antenna arm, a dielectric-cavity in the substrate extending from below at least a portion the emitter region to below at least a portion of the receiver region, and the broadcast antenna arm extending from the emitter region over the dielectric-cavity and the receiver antenna arm extending from the receiver region over the dielectric-cavity, wherein the broadcast plasmonic antenna is capable of propagating a selected wavelength of surface plasmons across the broadcast region which generate a symmetric charge distribution from the top to bottom surface of the broadcast antenna arm edge and decay into photons that are transmitted in-plane and in-phase through a dielectric medium to the receiver plasmonic antenna in the far field where the photons excite surface plasmons in the receiver region.

These and other aspects of the present disclosure will become apparent to one of ordinary skill in the art upon reading the following detailed description and the claims appended thereto.

BRIEF DESCRIPTION OF THE DRAWINGS

FIG. 4A shows normalized experimental near-field electromagnetic intensity in the broadcast region of wireless communication, FIG. 4B shows normalized intensity numerically calculated in the broadcast region, FIG. 4C shows intensity transverse cut realized in FIG. 4A and FIG. 4B at the dashed lines, FIG. 4D shows normalized experimental near-field intensity in the receiver region, FIG. 4E shows normalized intensity numerically calculated in the receiver region, and FIG. 4F shows intensity transverse cut realized in FIG. 4D and FIG. 4E at the dashed lines;

signals.

DETAILED DESCRIPTION

The present disclosure is directed to a wireless communication system via nanoscale plasmonic antennas. The technology is applicable to a range of radiation from ultra-violet to infrared regions. The use of visible wavelengths allows system miniaturization and high energy confinement. Towards this end, the present invention describes a nanoscale wireless communication system that can operate at wavelengths from infrared to visible via in-plane information transmission. Here, plasmonic antenna radiation mediates a three-step conversion process (surface plasmon-→photon→surface plasmon) with in-plane and in-phase efficiency (plasmon→plasmon), for example, at 38% efficiency at a wavelength of 660 nm for antenna separation of $4\lambda_0$ (with $\lambda_0$ the free-space excitation wavelength). Information transmission is demonstrated at bandwidths in the Hz and MHz ranges. Thus, the present invention opens the possibility of optical conveyance of information using plasmonic antennas for on-chip communication technology.

The current invention presents the realization of the first nanoscale wireless communication system (nWCS) operating at visible wavelengths and based on plasmonic antennas. Such a system is implemented in an in-plane configuration, meaning it allows information transmission and recovery via SPs propagating in the same plane. Communication is achieved across distances greater than several wavelengths. The operation of the system for in-plane information transmission is demonstrated by using near-field scanning optical microscopy (NSOM). Numerical calculations confirm the operational principle of the realized system and show good agreement with experimental data. The system of the present invention may be used for many possible applications, including for quantum computation by using single-photon sources and detectors and high-speed information transmission.

Figure 14:
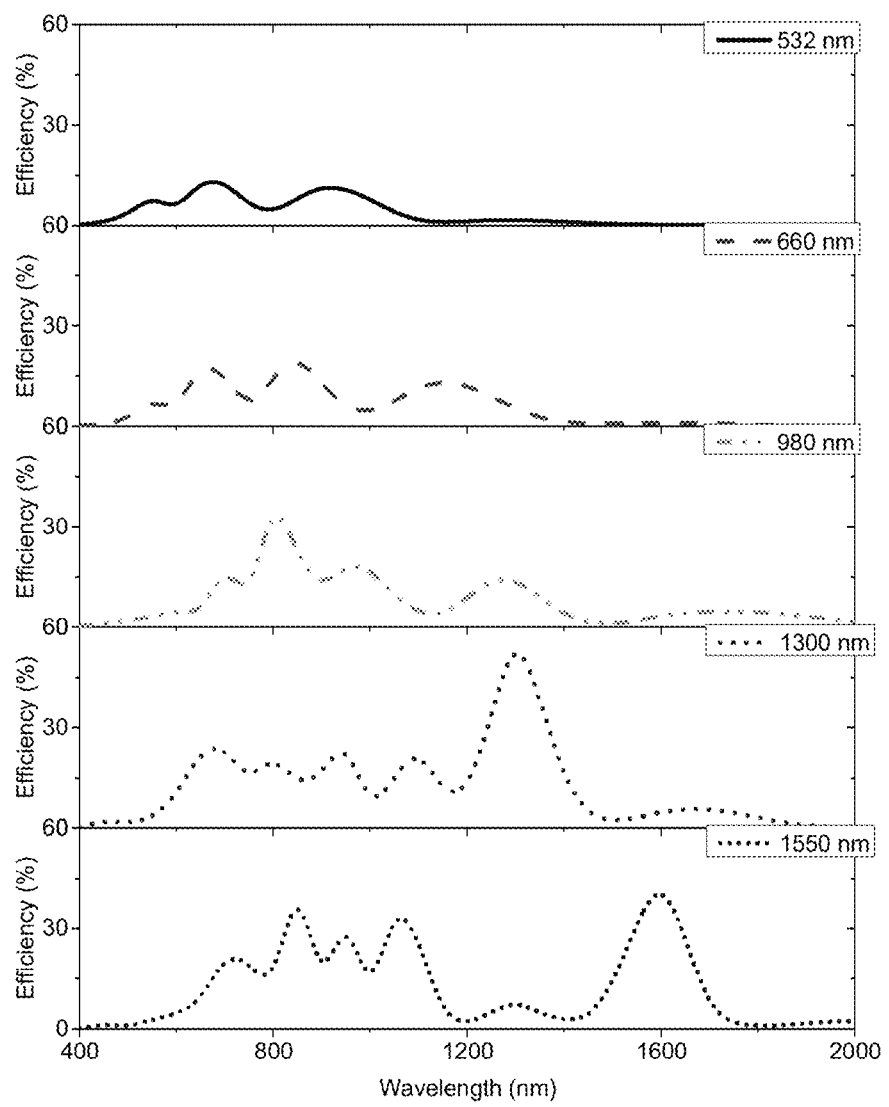
FIG. 14 shows the calculated efficiency spectrum for different operation wavelengths for a distance of $20\lambda_0$ on a device made of silver (Ag)
Figure 15:
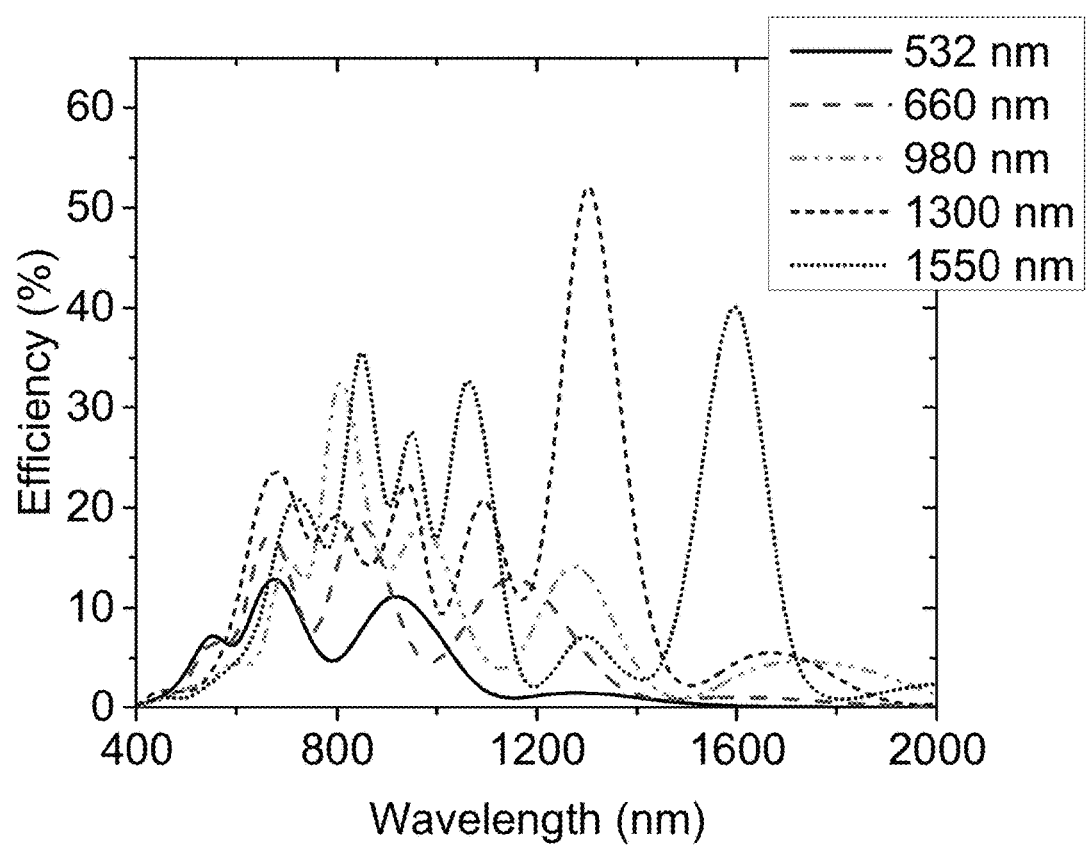
FIG. 15 shows the calculated efficiency spectrum for a composite of the different operation wavelengths shown in FIG. 14.

In addition to the application of the wireless communication system of the present invention to monochromatic (single wavelength or color) operation, the application of the device can be extend to a selected wavelength within a broad spectrum of frequencies, in the visible as well as from the ultra-violate to infrared range. The latter makes the device attractive with respect to compatibility with modern telecommunications technology. The propagating SP can be generated by a series of ways, among others, a focused far field optical field, an electron beam, the fluorescence of a two-level system, or waveguide coupling. Operation spectrum of the device can be tuned by changing the geometric properties, such as the antennae dimensions and thickness of the metallic film. As an example, FIGS. 14 and 15 show the calculated efficiency spectrum for different operation wavelengths, i.e., 532 nm (solid line), 660 nm (dashed line), 980 nm (dashed dotted line), 1300 nm (short dashed line), and 1550 nm (dotted line), for a distance of $20\lambda_0$ (i.e., 20 times the wavelength of the incident light that generates the surface plasmon) on a device made of silver (Ag). The higher efficiency on the near-infrared regime is due to the lower losses on the plasmonic metal.

Figure 16:
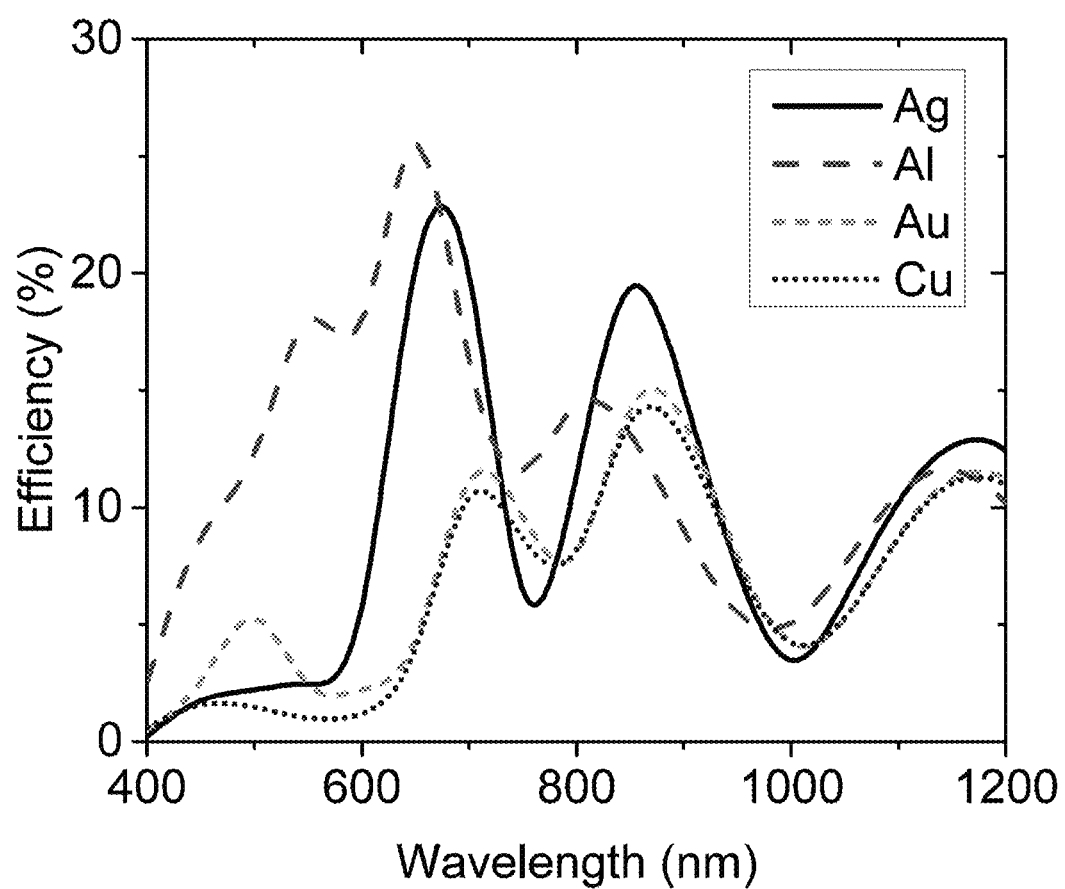
FIG. 16 shows the spectral efficiency of Ag, Al, Au and Cu for a device at an inter-plasmonic antenna distance of $4\lambda_0$.

In addition to Ag, suitable materials include any plasmonic metals, for example Al, Au, Cu, ITO or TiN. Advantages of having different materials are better control of performance, depending on the spectral range of operation, and better compatibility with modern technology complementary metal-oxide semiconductor (CMOS) compatibility. In the cases of Al and Cu, the reduction of the cost of the device makes it more attractive for industrial applications. FIG. 16 shows the spectral efficiency of Ag (solid line), Al (long dashed line), Au (short dashed line) and Cu (dotted line) for a device with an inter-plasmonic antenna distance of $4\lambda_0$.

Figure 6A:
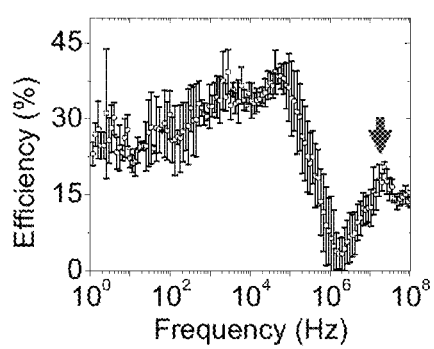
FIG. 6A shows the efficiency of the system as a function of the driving frequency.
Figure 17:
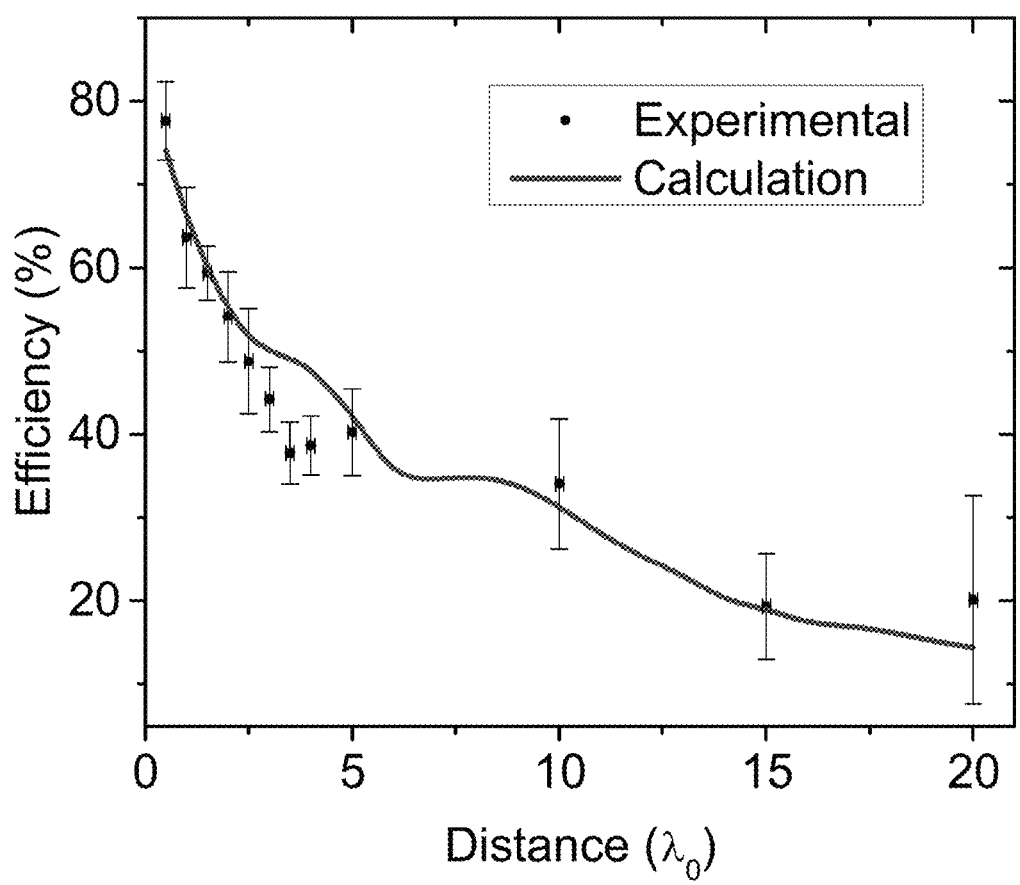
FIG. 17 shows calculated and experimental efficiencies using a Ag device, wavelength of 660 nm at an inter-plasmonic antenna distance of from 0.5 to $20\lambda_0$.
Figure 18:
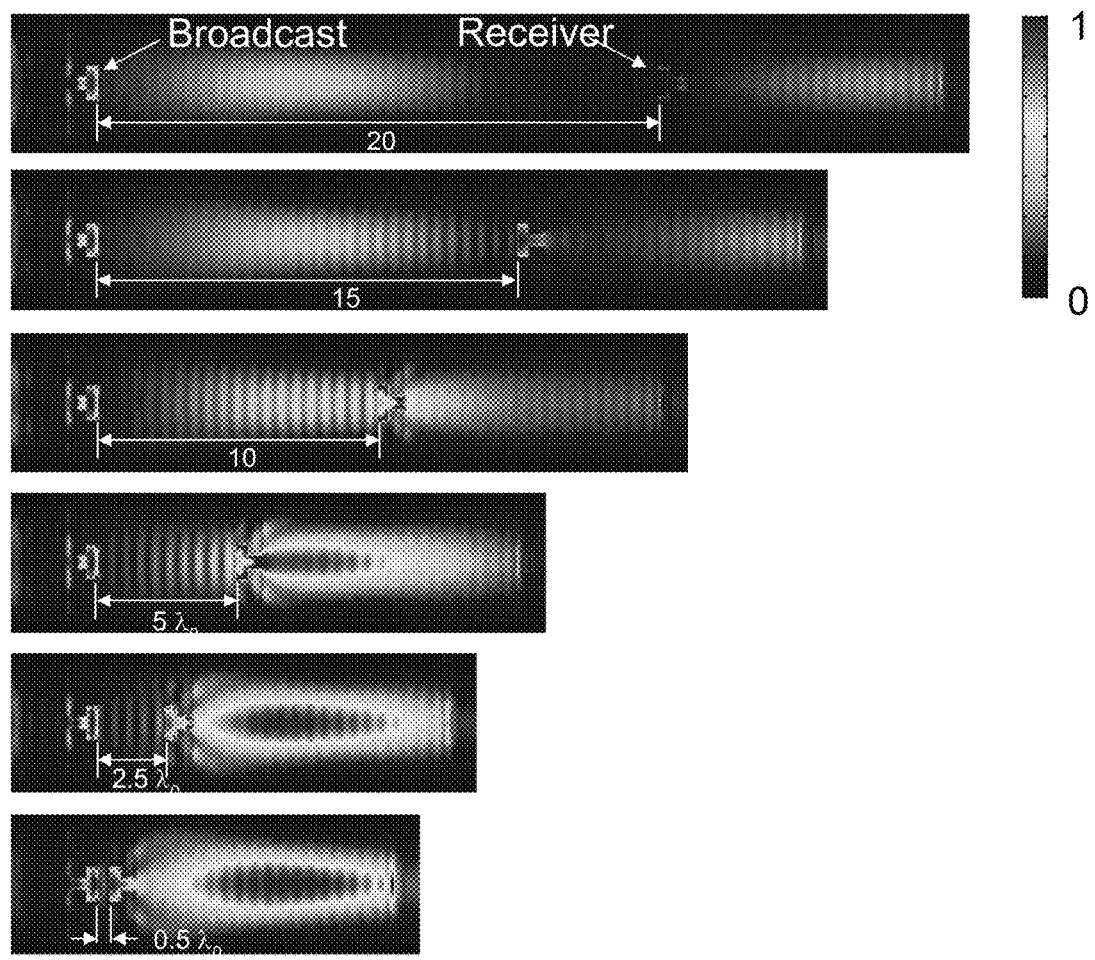
FIG. 18 shows computer simulations of the intensity of the electric field contained with the plasmonic regions (broadcast and receiver) and free space in between, from 0.5 to 20 times the wavelength of the radiation.

As shown in FIG. 6A, the device showed the ability to transfer information wirelessly along distances in the far field ($d>2\lambda_0$). In accordance with an embodiment of the present invention, in-plane far field information transmission via wireless plasmonic antennae distance could be extended beyond $4\lambda_0$ without any geometric modification of the device, to the range of $20\lambda_0$, with efficiency of about 10%. Experimental confirmation is presented in FIG. 17, where the calculated and experimental efficiencies are compared using an Ag device, wavelength of 660 nm and the same antenna geometry. FIG. 18 shows computer simulations of the intensity of the electric field contained within the plasmonic regions (broadcast and receiver) and free space in between, from 0.5 to 20 times the wavelength of the radiation.

Figure 1A:
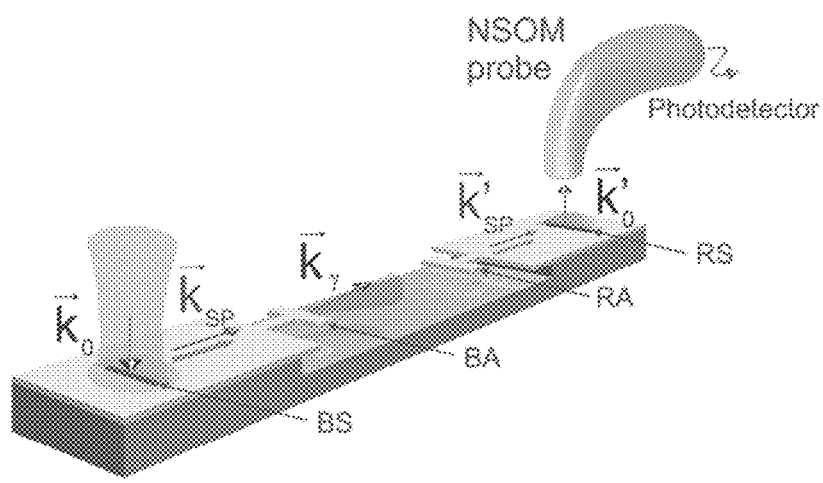
FIG. 1A shows a schematic representation of an embodiment of the nWCS system.
Figure 1B:
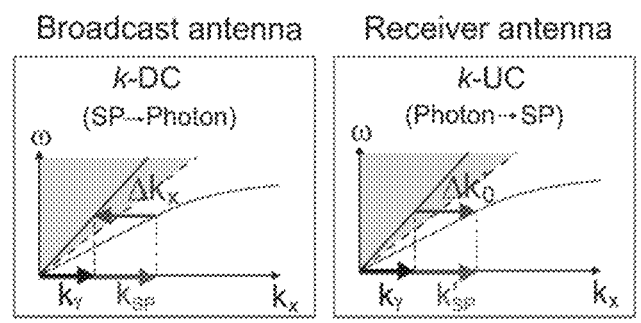
FIG. 1B shows dispersion relations of the three-step momentum conversion process of the BA and RA and FIG. 1C shows a schematic representation of an embodiment of a nanoscale wireless communication device, in accordance with the present invention.
Figure 1C:
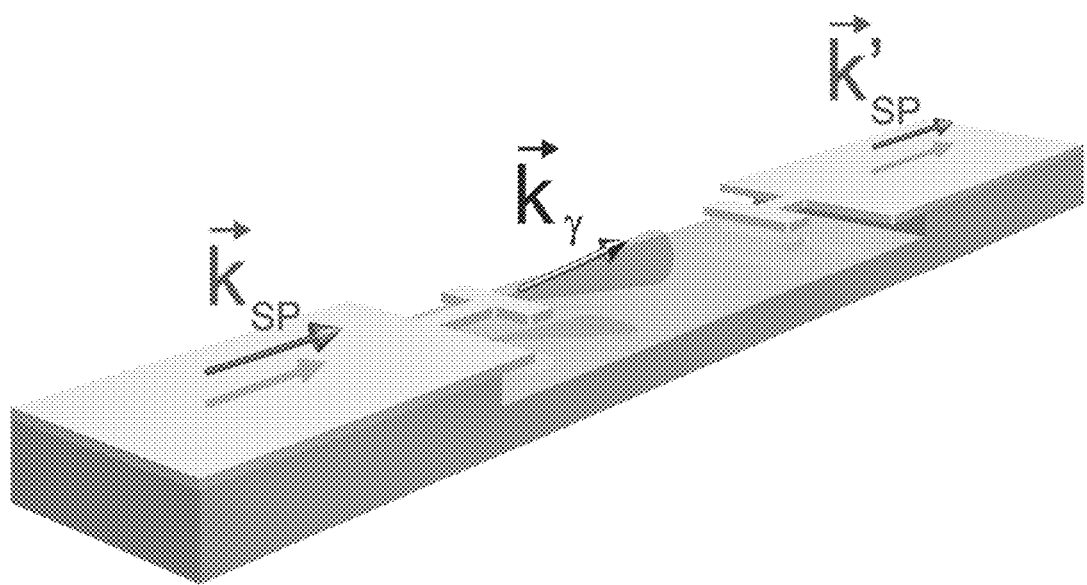

FIGS. 1A and 1B show the operation principle in accordance with an embodiment of an nWCS scheme. FIG. 1A shows a schematic representation of the system, where the arrows represent the momentum of each interacting electromagnetic entity. An NSOM probe for detecting the final photon is depicted. BS and BA refer to broadcast slit and antenna, while RS and RA to receiver slit and antenna, respectively. FIG. 1B shows dispersion relations of the three-step momentum conversion process, where the shaded zones represent the available momentum modes and the dashed lines the so-called light line. The curved red line represents the SP branch and the magnitudes of $\Delta k_x$ and $\Delta k_0'$ were exaggerated to make clear the k-UC and k-DC. Here, $\vec{k}_0$, $\vec{k}_y$, $\vec{k}'_0$ are the wave vectors of incident, transmitted and measured photons respectively, while $\vec{k}_{SP}$ and $\vec{k}'_{SP}$ are the wave vectors of the SPs in the broadcast and receiver regions, respectively. FIG. 1C shows a schematic representation of a device wherein plasmonic antenna radiation mediates a three-step conversion process (surface plasmon-→photon→surface plasmon) with in-plane and in-phase efficiency (plasmon→plasmon).

Figure 2A:
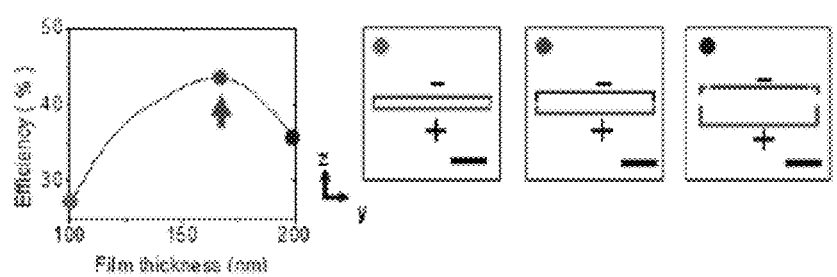
FIG. 2A shows system efficiency as a function of Ag film thickness.
Figure 2B:
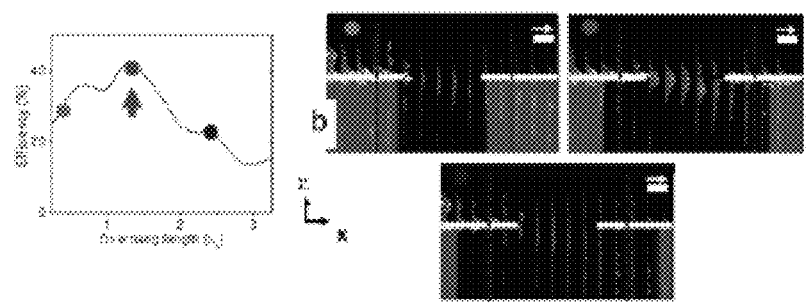
FIG. 2B shows efficiency as a function of the overhang length of the broadcast and receiver antennas, using an optimized Ag film thickness
Figure 2C:
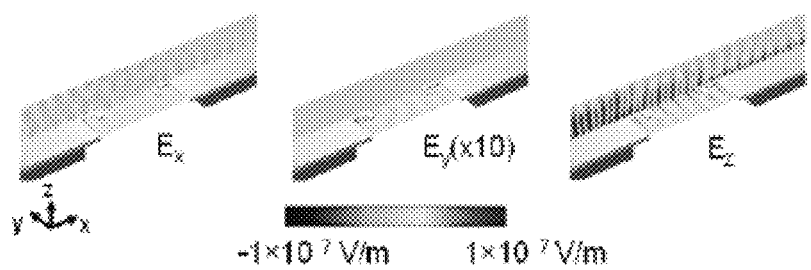
FIG. 2C shows calculated electric field components.

FIGS. 2A-C show numerical optimization of the nWCS shown in FIG. 1A at an operational wavelength of 660 nm. FIG. 2A shows system efficiency as a function of Ag film thickness. The inset shows the surface charge density calculated at the front face of the broadcast antenna: the film thickness corresponds to the red arrow in the plot; the red and blue outlines correspond to positive and negative charge, respectively, and the scale bar is 500 nm. FIG. 2B shows efficiency as a function of the overhang length of the broadcast and receiver antennas, using the optimized Ag film thickness. The overhang length is the length of the planar emitter region and broadcast antenna arm extending beyond the substrate and overhanging the dielectric-cavity, as well as the length of the planar receiver region and receiver antenna arm extending beyond the substrate and overhanging the dielectric-cavity. The inset shows the averaged power flow corresponding to the overhang length indicated by the red arrow in the plot. The scale bars in the three simulation images represent 1 µm and the yellow arrows $5 \times 10^{-5}$ W, while the black, white, and red zones represent air, Ag, and glass, respectively. FIG. 2C shows calculated electric field components, $E_x$, $E_y$, $E_z$ with optimized parameters corresponding to the red arrows in a and b. The color bar at the bottom is the same for each of the three field-component images. Note the coordinate references in each image.

Figure 3A:
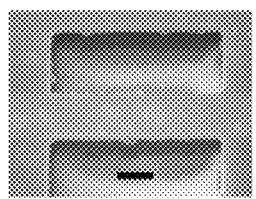
FIG. 3A shows fabrication of parallel rectangles.
Figure 3B:
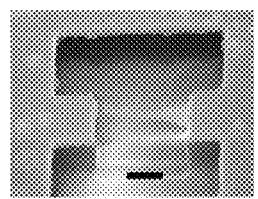
FIG. 3B shows fabrication of the inter-antenna space.
Figure 3C:
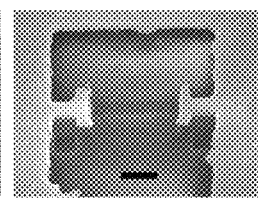
FIG. 3C shows fabrication of the antenna arm shapes and FIG. 3D shows the system after fabrication of slits, wherein the inset shows the shape of the air-cavity below the receiver region.
Figure 3D:
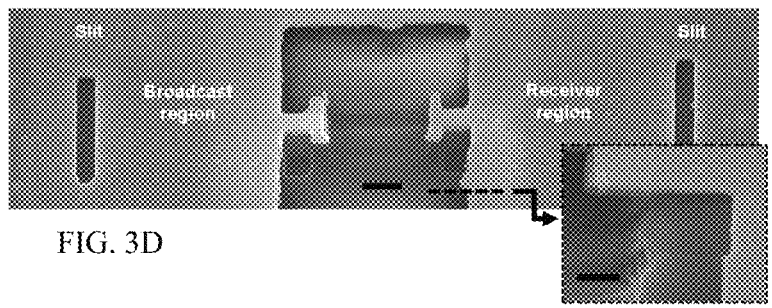

FIGS. 3A-D show fabrication steps to create an embodiment of an nWCS. FIG. 3A shows fabrication of parallel rectangles milled on the Ag surface after wet etching of glass substrate. FIG. 3B shows fabrication of the inter-antenna space. FIG. 3C shows fabrication of the antenna arm shapes. FIG. 3D shows the final system after fabrication of slits. FIG. 3D Inset: Transverse cut along the dashed line on FIG. 3D showing the shape of the air-cavity below the receiver region. It is understood that FIG. 3D shows an air-cavity as one example of the dielectric-cavity of the device. The dielectric-cavity below the plane of the antennas, as well as the in-plane space between the antennas and the space above the plane of the antennas can be occupied by any dielectric. All the cases are false color SEM images where the red and yellow zones represent, respectively, glass and silver; the sample was tilted 45°.

FIGS. 4A-F show experimental demonstration of wireless communication. FIG. 4A shows normalized experimental electromagnetic intensity in the broadcast region. FIG. 4B shows normalized intensity numerically calculated in the broadcast region. FIG. 4C shows intensity transverse cut realized at the dashed lines in FIG. 4A (experimental lower line) and at the dashed lines in FIG. 4B (calculated upper line). Note the magnification on the dashed rectangle to make clear the intensity features. FIG. 4D shows normalized experimental intensity in the receiver region. FIG. 4E shows normalized intensity numerically calculated in the receiver region. FIG. 4F shows intensity transverse cut realized at the dashed lines in FIG. 4D (experimental lower line) and at the dashed lines in FIG. 4E (calculated upper line).

Figure 5A:
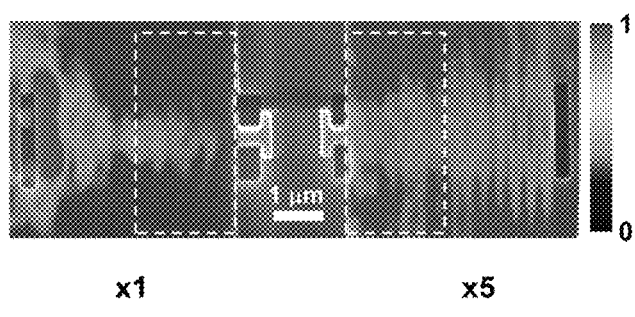
FIG. 5A shows normalized experimental near-field intensity superimposed onto SEM image on the nWCS and FIG. 5B shows a comparison between calculated and experimental efficiencies.
Figure 5B:
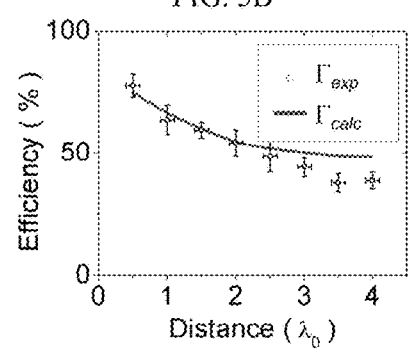

FIGS. 5A-B show observation of the wireless transmission process and measured efficiency. FIG. 5A shows normalized experimental intensity superimposed onto a scanning electron microscope (SEM) image on the nWCS (note that the scale factor on the receiver side has been changed to provide a better comparison). The receiver region intensity has been multiplied by 5 for comparison purposes. FIG. 5B shows a comparison between calculated ($\Gamma_{calc}$, red line) and experimental ($\Gamma_{exp}$, black circles) efficiencies. The vertical error bars represent the standard deviation of the efficiency measured after three experiments. The horizontal error bars represent the inter-antenna distance error.

Figure 6C:
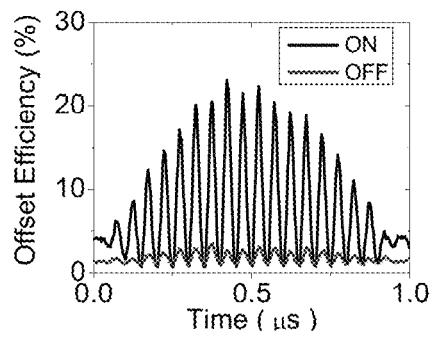
FIG. 6C shows a comparison between the efficiencies on the ON (upper signal) and OFF (lower signal) slit states and FIG. 6D shows the ratio between the envelope amplitudes of signals corresponding to ON and OFF slit states measured at the maximum efficiency (arrow)
Figure 6B:
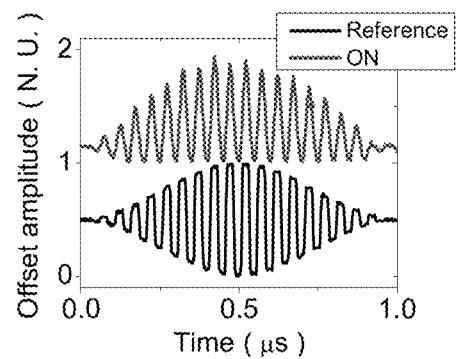
FIG. 6B shows a comparison between the reference (lower) and the detected (upper)
Figure 6D:
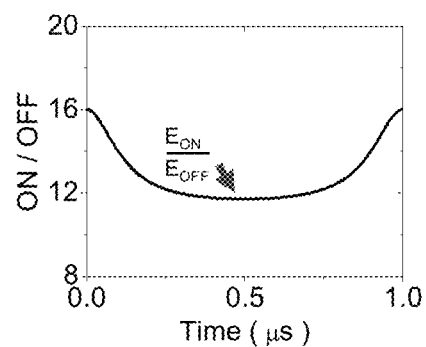

FIGS. 6A-D show information transmission demonstration. FIG. 6A shows the efficiency of the system as a function of the driving frequency. The red arrow shows the used frequency. FIG. 6B shows a comparison between the reference (lower black line) and the detected (upper red line, offset for clarity) signals, normalized to their maximum values. FIG. 6C shows a comparison between the efficiencies on the ON (upper line) and OFF (lower line) slit states. FIG. 6D shows the ratio between the envelope amplitudes of signals corresponding to ON and OFF slit states measured at the maximum efficiency (red arrow). ON refers to incoming light incident on the broadcast slit in the nWCS, while OFF refers to incoming light incident near but not on the broadcast slit.

Figure 7A:
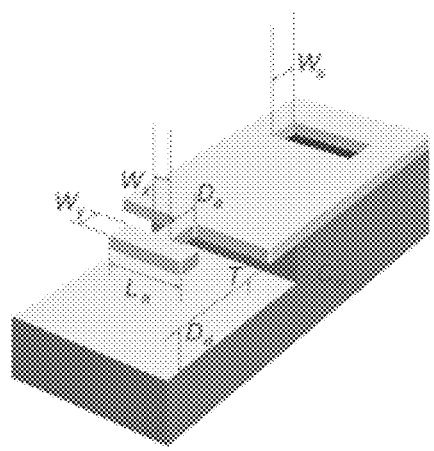
FIG. 7A shows dimension definitions on the emitter/receiver antenna and FIG. 7B shows inter-antenna distance definition.
Figure 7B:
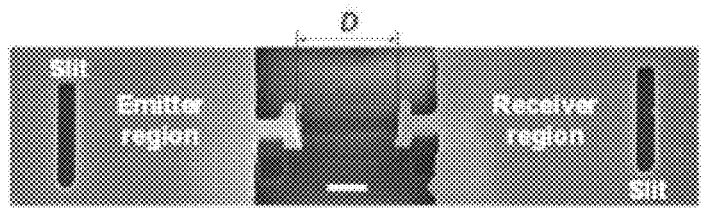

FIG. 7A shows dimension parameter definitions of the broadcast emitter and receiver antennae and FIG. 7B inter-antenna distance definition.

Figure 8A:
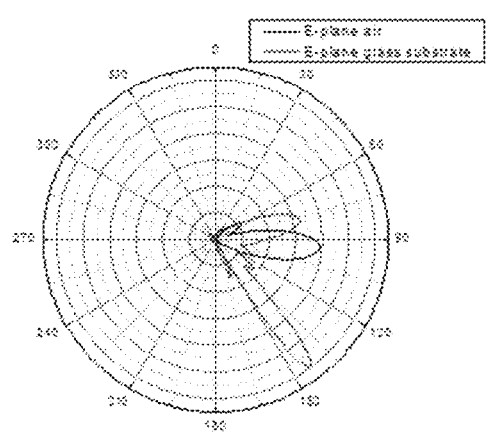
FIG. 8A shows calculated far-field radiation pattern generated by an nWCS for the E-plane of FIG. 7A

FIG. 8A shows calculated far field radiation pattern generated by an nWCS for the E-plane of FIG. 7A (middle plot air and end plots glass substrate) and FIG. 9B shows calculated far field radiation pattern H-plane of FIG. 7B (outer plot air and inner plot glass substrate).

Figure 10A:
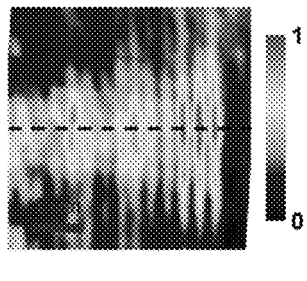
FIG. 10A shows plasmonic standing wave characteristics measured by NSOM of near-field intensity, FIG. 10B intensity profile made in the dashed line in FIG. 10A.
Figure 10B:
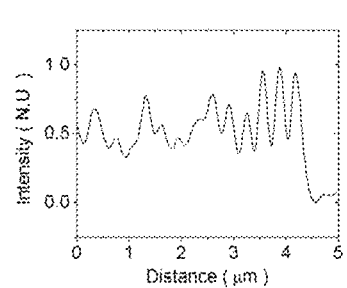
FIG. 10C is power spectrum of the intensity profile shown in FIG. 10B.
FIG. 10D shows near-field intensity of a non-confined SP and FIG. 10E shows intensity profile realized in the dashed line of FIG. 10D and numerical fit.
Figure 10C:
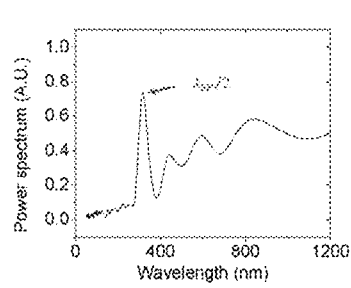
Figure 10D:
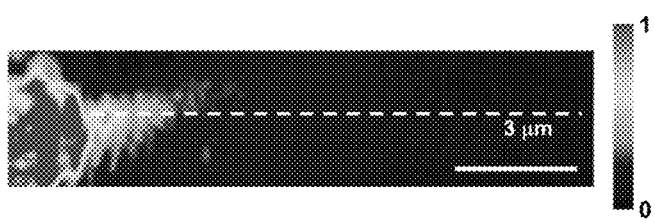
Figure 10E:
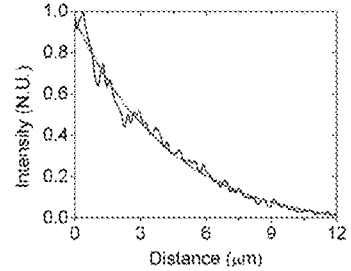

FIGS. 10A-E shows plasmonic standing wave characteristics measured by NSOM. FIG. 10A intensity. FIG. 10B intensity profile made in the dashed line in FIG. 10A. FIG. 10C power spectrum of the intensity profile shown in FIG. 10B. FIG. 10D intensity of a non-confined SP. FIG. 10E black line, intensity profile realized in the dashed line of FIG. 10D and, red line, numerical fit.

Figure 11A:
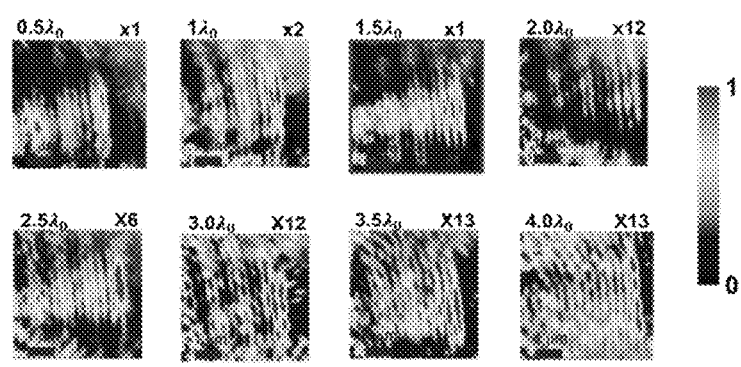
FIG. 11A is a complete set of near-field intensities for the different inter-antenna distances and FIG. 11B shows three dimensional representation of the sample topography.
Figure 11B:
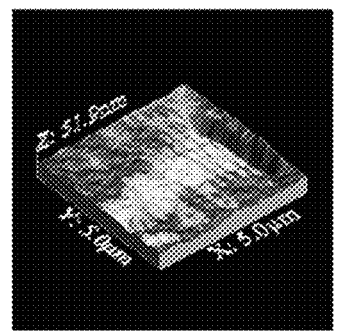

FIGS. 11A-B shows FIG. 11A complete set of intensities for the different inter-antenna distances. FIG. 11B shows three dimensional representation of the sample topography.

The optimization process was done by a parametric study on the nWCS dimensions. Such dimensions are shown in FIG. 7A, where $W_y$ is the length of the antenna arm, $L_a$ the antenna arm width, $D_a$ the extension of the antenna base, $W_x$ the width of the free standing elements, T the film thickness, $C_d$ dielectric-cavity depth below the emitter/receiver regions and $W_s$ the slit width; The inter-antenna distance D is defined as the space separating the end edges on the plasmonic antennas. The dimensions of the antenna, $W_x$, $W_y$, $D_a$, $L_a$, $D_d$, $C_d$, D and T are considered when maximizing the efficiency of the system.

Without further elaboration, it is believed that one skilled in the art can, based on the above description, utilize the present invention to its fullest extent. The following specific embodiments and examples are, therefore, to be construed as merely illustrative, and not limitative of the remainder of the disclosure in any way whatsoever.

EXAMPLES

Example 1

Numerical Optimization

The conceptual scheme of the nWCS operation is shown in FIG. 1A. A vertically-incident photon $\vec{k}_0$ generates a SP via k-UC by interacting with the slit (BS in FIG. 1A) in the broadcast region. The SP, indicated by $\vec{k}_{SP}$, propagates across the broadcast region and decays to photon $\vec{k}_y$ via k-DC at the broadcast antenna (BA in FIG. 1A). The radiated photon travels across the inter-antenna (free) space to the receiver antenna (RA in FIG. 1A), which collects the propagating photon and converts it into SP $\vec{k}'_{SP}$ via k-UC, which propagates in the receiver region. Finally, this SP decays to photon $\vec{k}'_0$ via k-DC when it interacts with the slit (RS in FIG. 1A) in the receiver region. As can be seen, the processes at the slits do not explicitly affect the communication process being considered, but they were included for SP generation (broadcast) and symmetry (receiver) purposes. A simplified version of the nWCS operation is presented as dispersion schemes in FIG. 1B; the dispersion in the inter-antenna space is not included because the photon does not change its nature there.

A main interest is in optimizing the transfer of propagating SPs from the broadcast to the receiver region by free-space radiation—hence it is not centered on the net emissive power of the PAs, but on the in-plane transmitted power. Thus, an efficiency F may be defined as the ratio between the powers measured in the broadcast and receiver regions, i.e., $\Gamma = P_{receive}/P_{broadcast}$, understanding the power as the integrated intensity over the measured area.

The nWCS design was optimized by numerical calculation of the maximum efficiency as a function of metallic film thickness (T), air-cavity depth below the broadcast and receiver regions ($C_d$), and antenna arm length ($L_a$); see FIG. 7A for a definition of nWCS dimensions. For the calculations, a three-dimensional numerical model was used based on the finite element method (COMSOL). The light source was linearly polarized (transverse magnetic) with wavelength 660 nm (454 THz). Ag was used as the plasmonic metal due to its good plasmonic response at the working wavelength and long SP propagation length. The dielectric constants were set as: air=1.00, glass=2.25, and Ag=−20.15+0.46i. The dimensions shown in FIG. 7A of the device shown in FIG. 7B are $W_x=W_y=200$ nm, $D_a=460$ nm, $L_a=800$ nm, $C_d=D_d=1000$ nm and T=170 nm.

As previously stated, the slit in the broadcast region produces the initial k-UC, creating SPs whose E-field is polarized primarily in the vertical direction. As can be seen in FIG. 2A, the maximum efficiency is obtained when the thickness of the Ag film (T) is tuned to generate a dipolar resonant condition at the broadcast antenna edge, see inset. Different modes are excited in the PA edge as the thickness is tuned, however, the dipolar mode allows efficient in-plane information transmission, due to the symmetric radiation generated by the upper and lower edges. In the present example, the dipolar condition is obtained when the film thickness is about one fourth the excitation wavelength. This follows from rescaling of the SP wavelength due to the strong confinement at the PA edge.

The air-cavity depth ($C_d$) below the antenna regions plays an important role because the absence of the substrate, which has a higher refractive index than air, is necessary for the photons to propagate close to the horizontal direction (−5° with respect to the horizontal) in the inter-antenna space, as seen in FIG. 8. The equivalent case would be a system surrounded by a medium identical to the substrate. The present invention has avoided such inclusion of a high refractive index material because, although it would provide higher confinement of SPs on the metallic surface, it would generate an additional loss channel, reducing the SP propagation length. FIG. 2B shows the calculated efficiency when the overhang length is modified; as expected, the efficiency shows resonant behavior because the finite length of the broadcast region allows the SPs to resonate on the top and bottom surfaces. A symmetric charge distribution from the top to bottom surface of the broadcast antenna arm edge can be generated by a dipolar resonant condition. The effect of the air-cavity depth on the electromagnetic power flow, shown at the inset, demonstrates that only the optimum condition allows the power flow to be horizontal, resulting in an efficient in-plane and in-phase information transmission, per the image identified with the red circle in the inset to FIG. 2B.

Figure 9:
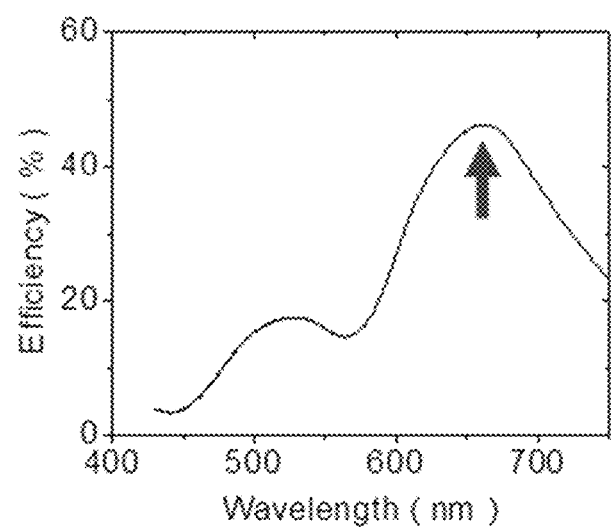
FIG. 9 shows dependence of calculated efficiency on the operation wavelength.

Once the maximum efficiency was obtained, the free-space transmission was characterized by calculating the components of the electric field. In FIG. 2C, the vector components of the electric field, using the optimized parameters, are displayed. The component $E_z$ was found to dominate this transmission, as would be expected considering the vertical polarization of the SP E-field. As stated above, due to the symmetry of the nWCS, the effects of $E_x$ and $E_y$ are negligible for the free-space transmission process and consequently do not affect the information transmission. Finally, a confirmation of the maximum efficiency obtained with the proposed excitation wavelength is shown in FIG. 9.

Far Field Radiation Pattern

Figure 8B:
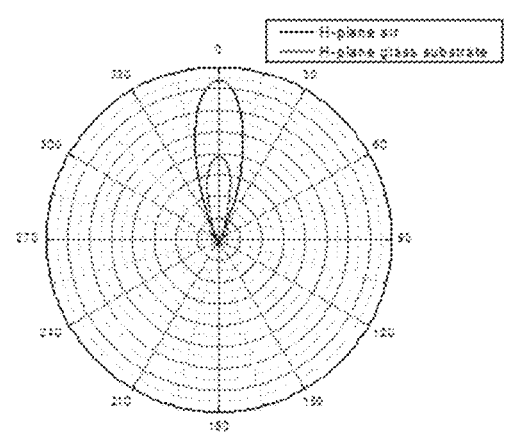
FIG. 8B shows calculated far-field radiation pattern H-plane of FIG. 7B.

The far field radiation pattern for the nWCS was calculated. FIG. 8A shows the E-plane component of the far field radiation pattern when the substrates used are air (middle black line) and glass (outside red lines). FIG. 8B shows the H-plane component of the far field radiation pattern following the same conditions as shown in FIG. 8A.

Excitation Wavelength

Once the optimized parameters were obtained, the efficiency as function of the wavelength operation was studied. FIG. 9 shows dependence of calculated efficiency on the operation wavelength where the red arrow represents the excitation wavelength used. The periodic behavior is due to the finite size of the broadcast/receiver regions where the SPs can resonate.

Example 2

Sample Fabrication

Using the optimized parameters of the device fabricated in Example 1, the nWCS was fabricated by the following procedure: a Ag film of ~170 nm thickness was deposited onto a clean glass substrate by sputtering with a Ti adhesion layer of ~5 nm thickness. Using focused ion beam (FIB), two parallel rectangles were milled on the Ag film. The air-cavity below the broadcast/receiver regions was fabricated by wet-etching the glass substrate by immersion of the sample in buffered oxide etch solution. A second FIB milling created the inter-antenna space, and the broadcast/receiver antennas were fabricated in a third milling process. The nWCS was completed by FIB milling the slits in the broadcast/receiver regions. Samples were fabricated with inter-antenna distance ranging from $0.5\lambda_0$ to $4\lambda_0$ in steps of $0.5\lambda_0$. FIG. 3 shows the fabrication process by colored SEM images for an inter-antenna distance of $4\lambda_0$. In FIG. 3A the parallel rectangles were milled and the substrate was wet-etched. FIG. 3B shows the fabricated inter-antenna space, while FIG. 3C shows the milled antennas in the next step. Finally, in FIG. 3D the finished nWCS is displayed, including the slits. A transverse cut was made in the receiver region in order to see the cavity shape below such a region, inset to FIG. 3D. In a second transverse cut in the broadcast region, the symmetric shape was confirmed due to the isotropic etching of the substrate. Due to the experimental conditions and the fabrication capabilities, the error in the inter-antenna distance was measured as 10% and included later as horizontal error bars in the efficiency measurement report.

Example 3

Wireless Communication Transmission

Due to the localized nature of SPs, a commercial NSOM (Nanonics Multiview 4000) was used to observe the SP behavior at the sample surface. The NSOM probe had a metallic coating (Cr+Au also from Nanonics) and a 300 nm aperture diameter. Scanning was performed in contact mode with a resolution of 25 nm/point and speed of 24 ms/point over an area of 5×5 µm². The near-field intensity transmitted by the NSOM probe was measured by using a photon-counter and a signal amplifier. Additionally, the scanning over the sample surface was limited to the planar zones of the broadcast and receiver regions in order to preserve the probe integrity. This is due to the large depth of the bottom glass surface in the inter-antenna space—regardless of the integration time per point in the scanning, the probe would incur some damage, resulting in topographic and intensity artifacts. The light source was a laser diode, linearly polarized, with wavelength of 660 nm and ~50 mW output power, focused to a spot of ~1.5 µm diameter by a microscope objective (50×, NA=0.5). The polarization of the light beam was set perpendicular to the broadcast slit edge in order to maximize SP generation.

FIG. 4A shows the experimental intensity in the broadcast region for an inter-antenna distance of 1.54 From these data, it is clear that the k-UC at the broadcast region occurs at the slit and the SPs propagate left-to-right toward the broadcast antenna. Due to the well-matched impedance between SPs and photons at the broadcast antenna, there is a weak interaction between the incoming and the reflected SPs on the metal edge. The numerically calculated intensity is shown in FIG. 4B. In order to make a clear comparison, a transverse cut was made at the dashed line in FIGS. 4A-B and the results shown in FIG. 4C as offset intensities. Due to the limited resolution on the NSOM probe, the fine details reported at the slit edge in the calculated data are lost, however, the contrast in the experimental data at the slit edge is lower and the features in the intensity are better defined.

Next, FIG. 4D shows the experimental intensity in the receiver region. Such intensity is modulated by a pattern that is evidently a SP standing wave. This standing wave is the result of interference between the SPs converted from photons (k-UC) at the receiver antenna and the SPs reflected from the receiver slit; the pitch of the pattern agrees well with the SP wavelength (FIG. 10). By comparing the last result with that numerically obtained (FIG. 4E), it is clear that the calculated result is consistent with the experimental results. The comparison was made by a transverse cut realized at the dashed line in FIGS. 4D-E and shown in FIG. 4F. Although there is good coincidence between the profiles, as before, the NSOM probe resolution produced a loss of information at the slit edges.

The experimental intensity on the broadcast/receiver surfaces (FIG. 4A,D) is displayed as a color profile superimposed on an SEM image, FIG. 5A. There, the intensity in the receiver region was enhanced in order to be clearly distinguished on the same scale as the intensity reported at the broadcast region. As expected, in the receiver region, the SP coupling is done mainly in the PA, proof of this is the well localized beam behind the PA position. The complete set of intensities measured in the receiver region is shown in FIG. 11.

Example 4

Figure 12:
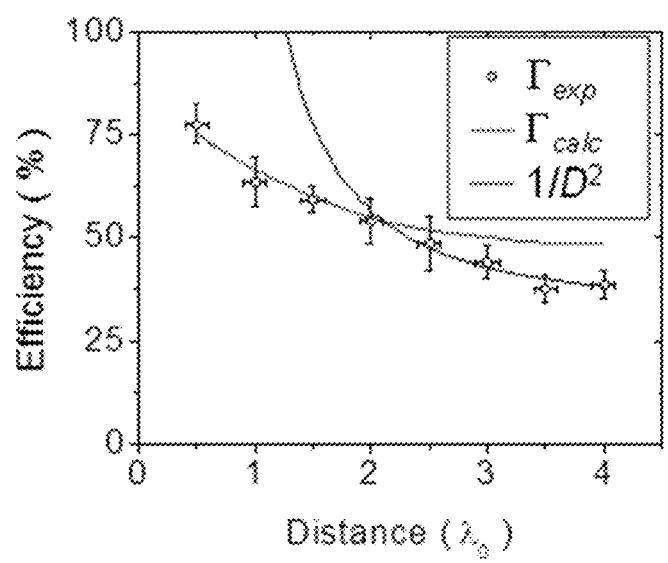
FIG. 12 shows far field fitting of the experimental results.

Transmitted power was measured experimentally and calculated numerically for multiple distances D as the integrated intensity over an area of 2×5 µm² behind the broadcast/emitter regions edges, see dashed rectangles in FIG. 5A. These areas where chosen in order to measure only the components of the signal, i.e. avoid any propagative component from the light source and metal edges. The experimental ($\Gamma_{exp}$) and calculated ($\Gamma_{calc}$) efficiencies are shown in FIG. 5B; the calculated efficiency is quite consistent with the experimental results. A difference in efficiencies is clear in the cases where the inter-antenna distance is longer than ~2$\lambda_0$. This difference is due to power losses from the Ag surface roughness and the mismatched coupling produced by the plasmonic antennas defects. The former implies that the nWCS efficiency, for distances of several wavelengths, can be improved by using atomically smooth surfaces. Additionally, the experimental result follows typical inverse-square power density decay (~1/D²) of antenna radiation in the far field region, i.e., at distances longer than 2$\lambda_0$ as shown in FIG. 12 which shows far field fitting of the experimental results.

In FIG. 5B, the vertical error bars were calculated as the standard deviation of the obtained efficiencies after a repetition (three times) of the experiment, while the horizontal bars as the fabrication defect in the inter-antennas distance.

The last results demonstrate that the nWCS allows the information transmission beyond the near-field interaction distance, i.e., along a distance of several wavelengths. From radio frequency theory, the far field region of an antenna is defined as any distance beyond 2D²/$\lambda_0$, with D the maximum linear dimension of the antenna. In the present invention, the far field region is located beyond 2$\lambda_0$. The present invention confirms that plasmonic antennas have been coupled in the far field on an in-plane scheme. The present invention describes this phenomenon for the first time and is reported and applied for information transmission.

Example 5

Wireless Communication Demonstration

While the objective of the present invention is proof-of-principle of in-plane wireless communication using PAs at optical frequencies, data transmission experiments were also performed in the near-infrared to show one possible application of the nWCS for in-plane communication. In all the cases, the inter-antenna distance was set to 2$\lambda_0$. The light source was a laser diode, linearly polarized, with wavelength of 780 nm and ~100 mW output power and focused to a spot of ~2.5 µm diameter. The laser intensity was modulated with a function generator by using a square signal (5 Vpp and offset of 2.5 V). Detection was done using the NSOM described above using a probe with an aperture diameter of 2 µm to enhance the detected intensity. The probe was set to contact mode in a fixed position at the center of the receiver region. The photon-counter signal was measured on an oscilloscope and averaged over 2,048 samples. The frequency was swept from 1 Hz to 100 MHz in 122 points and the efficiency was measured at each frequency. The information transmission efficiency as a function of the driving frequency of the complete system (light source, nWCS, NSOM probe and photodetector) is shown in FIG. 6A. The higher efficiency shown at the kHz range is due to the laser diode source performance and is not related with the nWCS, because the maximum information transmission speed of the plasmonic system is limited only by the dispersion of the metal used. Using a 20 MHz signal, where a local maximum was obtained in the frequency response (red arrow in FIG. 6A), and modulated by an envelope sinusoidal signal at 1 MHz, it is clear that the system reproduces finely the reference signal, FIG. 6B.

The present invention found that due to the Ag surface roughness, the generation of SPs is inevitable when the light beam is illuminating a region different from the slits, i.e., a flat region. The ON slit and OFF slit states are defined as the states where the beam is impinging the broadcast slit and a flat surface respectively, see FIG. 13 which shows the definition of ON/OFF slit states.

In FIG. 6C, we show both the ON and OFF slit state signals; indeed, it was found that the ON/OFF slit state signal ratio is of the order of 12, as shown in FIG. 6D. This ratio is enough to clearly distinguish between the state signals, and can be strongly increased by reducing the surface roughness of the metal film.

Example 6

Surface Plasmon Wavelength and Propagation Length

The interaction between the incoming and reflected SPs on the receiver region produces a standing wave that is observed in the near-field intensity. The particular case of an inter-antenna distance of $D=1.5\lambda_0$ is shown in FIG. 10A. The color represents a linear intensity scale with red and black showing the maximum and minimum respectively, while scale bar is 1 µm. An intensity transverse cut was made in the dashed line on FIG. 10A is shown in FIG. 10B in order to calculate the power spectrum of the resulting intensity profile (FIG. 10C). It is clear that the main peak of the power spectrum agrees correctly with half of the SP wavelength as shown by the red arrow, i.e., 320 nm. By measuring the SPP propagation on the sample surface, it was found that the propagation length was 4.4 µm. This value is certainly much shorter than the theoretical one (~80 µm) due to the high roughness and consequently to the strong radiation losses.

Example 7

Intensity at Different Distances

The normalized intensity registered in the complete set of samples is shown in FIG. 11A, where the inter-antenna distance is shown in each image at the top-left. In all the cases, the displayed area is 5×5 µm². In order to make an easier comparison between the different images the intensity scale has been adjusted in a factor shown at the top-right of each image. As it is well-known the NSOM is capable to imaging the intensity at the same time as the topography of the sample. Taking advantage of this, it is possible to localize the position of the interactions held in the sample surface. FIG. 11B shows a three-dimensional representation of the sample surface topography with the color corresponding to the near-field intensity measured simultaneously when $D=1.5\lambda_0$ (red frame in 11A). It is clear that the SP is reflecting on the receiver slit.

Example 8

Information Transmission Efficiency

As shown in FIG. 12, the circles represent the experimentally-determined efficiency, while the red line is the numerically calculated. The far field power density generated by an antenna follows a $1/D^2$ decay. In the particular case of the fabricated structures, this condition is obtained beyond a distance of $\sim 2\lambda_0$; see line blue. It can be seen that the experimental data follow finely the $1/D^2$ relation.

Example 9

ON/OFF Slit States

Figure 13:
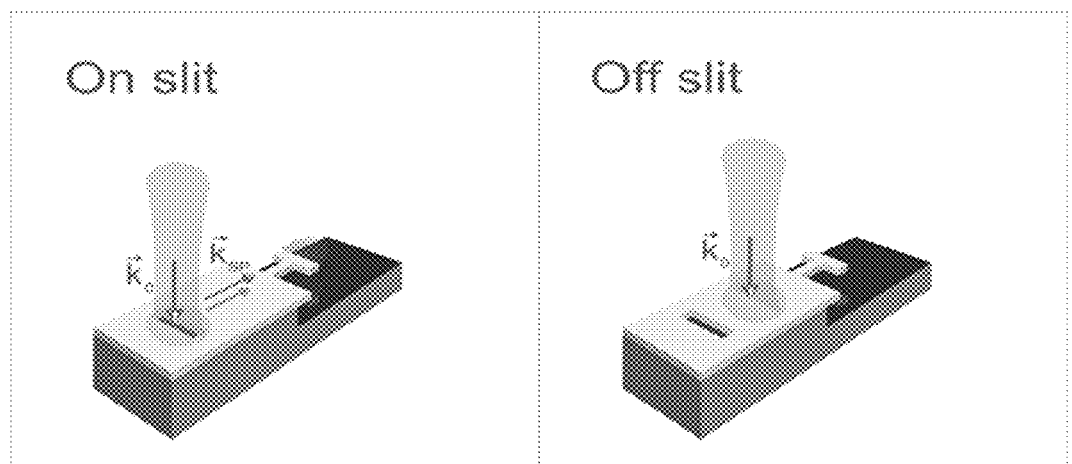
FIG. 13 is a schematic of ON/OFF slit states.

Due to the finite roughness on the Ag surface, the generation of surface plasmons is inevitable when the light source is illuminating a flat region. In such a case, two states have been defined: ON slit state, when the light beam is impinging on the emitter slit, and OFF slit state, when the light is impinging on any flat area on the emitter region, as shown in FIG. 13. Clearly, in the case of a perfectly flat surface, the OFF state must produce a null signal.

In summary, the present invention demonstrates the first approach to high efficiency in-plane information transmission using SP→photon→SP interactions by momentum up- and down-conversion processes. The fabrication procedure of the present invention is a three-step process (FIB-wet etch-FIB), realizing the design in an easy-to-develop architecture. Although the experimental efficiency is of the same order as that numerically calculated, it could be improved by using higher directivity antennas as well as smoother metal surfaces. An application of information transmission was shown, where frequency modulation was chosen for demonstration purposes but the maximum speed of the proposed system is limited only by the dispersion of the plasmonic metal used. In e.g., Ag (silver), this speed is a considerable fraction of the speed of light. The present invention could lead the way to a nanoscale and visible frequency equivalent of existing wireless communication systems. Some additional applications of the reported scheme are circuit switching by beam steering, high-efficiency coupling to plasmonic waveguides, and high-speed communication. Finally, the proposed in-plane wireless communication process, because some part of such a process is held in free-space, can improve the speed of the information transmission as much as 60% with respect to dielectric-loaded plasmonic waveguides and 50% to single plasmonic nanowire waveguides, yielding an asset to available technology based on plasmonic systems.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:
1. A nanoscale wireless communication system comprising:
   an energy source; and
   a device comprising:
      a planar substrate;

a first plasmon generator on a surface of the planar substrate;

a second plasmon generator on the surface of the planar substrate and comprising a receiver region;

a photon-broadcast antenna on the surface of the substrate that can convert a surface plasmon generated in the first plasmon generator into a photon and broadcast the photon; and a photon-receiver antenna on the surface of the substrate that can convert the broadcast photon received from the photon-broadcast antenna into a surface plasmon in the second plasmon generator, the photon-broadcast antenna extending out from and in the plane of the first plasmon generator, and the photon-receiver antenna extending out from and in the plane of the surface of the receiver region of the second plasmon generator, wherein the first plasmon generator propagates a surface plasmon from a selected wavelength of surface plasmons to the photon-broadcast antenna, which then generates a symmetric charge distribution from the top to bottom surface of the photon-broadcast antenna and wherein the surface plasmon from the first plasmon generator decays into, emits and broadcasts a photon that is transmitted in-plane and in-phase through a dielectric medium to the photon-receiver antenna in the far field where the received photon excites a surface plasmon in the receiver region of the second surface plasmon generator.

2. The system of claim 1, wherein the selected wavelength comprises a wavelength in the ultra-violet to infrared region.

3. The system of claim 1, wherein the first plasmon generator and second plasmon generator comprise Ag, Au, Al, Cu, ITO or TiN.

4. The system of claim 1, wherein the source of energy comprises monochromatic or polychromatic radiation in the ultra-violet to infrared region.

5. The system of claim 1, wherein the source of energy comprises a focused far-field optical field, an electron beam, the fluorescence of a two-level system, or waveguide coupling.

6. The system of claim 1, wherein the distance between the photon-broadcast antenna and the photon-receiver antenna is from about 2 to about 20 times the selected wavelength.

7. The system of claim 1, wherein the symmetric charge distribution comprises a dipolar resonant condition.

8. The system of claim 1, wherein the dielectric medium comprises air.

9. A nanoscale wireless communication device comprising:

a planar substrate;

a first plasmon generator on a surface of the planar substrate;

a second plasmon generator on the surface of the planar substrate and comprising a receiver region;

a photon-broadcast antenna on the surface of the substrate that can convert a surface plasmon generated in the first plasmon generator into a photon and broadcast the photon; and a photon-receiver antenna on the surface of the substrate that can convert the broadcast photon received from the photon-broadcast antenna into a surface plasmon in the second plasmon generator, the photon-broadcast antenna extending out from and in the plane of the first plasmon generator, and the photon-receiver antenna extending out from and in the plane of the surface of the receiver region of the second plasmon generator, wherein the first plasmon generator propagates a surface plasmon from a selected wavelength of surface plasmons to the photon-broadcast antenna, which then generates a symmetric charge distribution from the top to bottom surface of the photon-broadcast antenna and wherein the surface plasmon from the first plasmon generator decays into, emits and broadcasts a photon that is transmitted in-plane and in-phase through a dielectric medium to the photon-receiver antenna in the far field where the received photon excites a surface plasmon in the receiver region of the second surface plasmon generator.

10. The device of claim 9, wherein the selected wavelength comprises a wavelength in the ultra-violet to infrared region.

11. The device of claim 9, wherein the first plasmon generator and second plasmon generator comprises Ag, Au, Al, Cu, ITO or TiN.

12. The device of claim 9, wherein the distance between the photon-broadcast antenna and the photon-receiver antenna is from about 2 to about 20 times the selected wavelength.

13. The device of claim 9, wherein the symmetric charge distribution comprises a dipolar resonant condition.

14. The device of claim 9, wherein the dielectric medium comprises air.

15. A nanoscale wireless communication system comprising:

an energy source; and a device comprising:

a planar substrate, a broadcast plasmonic antenna on a surface of the substrate and comprising a planar plasmonic material comprising a planar emitter region and a broadcast antenna arm, a receiver plasmonic antenna on the surface of the substrate and comprising the planar plasmonic material comprising a planar receiver region; and a receiver antenna arm, a dielectric-cavity in the substrate extending from below at least a portion the emitter region to below at least a portion of the receiver region, the broadcast antenna arm extending from the emitter region over the dielectric-cavity and the receiver antenna arm extending from the receiver region over the dielectric-cavity, wherein the broadcast plasmonic antenna is capable of propagating a selected wavelength of surface plasmons across the broadcast region which generate a symmetric charge distribution from the top to bottom surface of the broadcast antenna arm edge and decay into photons that are transmitted in-plane and in-phase through a dielectric medium to the receiver plasmonic antenna in the far field where the photons excite surface plasmons in the receiver region, wherein the distance between the broadcast antenna arm edge and the receiver antenna arm edge is from about 2 to about 20 times the selected wavelength.

16. A nanoscale wireless communication device comprising:

a planar substrate, a broadcast plasmonic antenna on a surface of the substrate and comprising a planar plasmonic material comprising a planar emitter region and a broadcast antenna arm, a receiver plasmonic antenna on the surface of the substrate and comprising the planar plasmonic material comprising a planar receiver region and a receiver antenna arm, a dielectric-cavity in the substrate extending from below at least a portion the emitter region to below at least a portion of the receiver region, the broadcast antenna arm extending from the emitter region over the dielectric-cavity and the receiver antenna arm extending from the receiver region over the dielectric-cavity, wherein the broadcast plasmonic antenna is capable of propagating a selected wavelength of surface plasmons across the broadcast region which generate a symmetric charge distribution from the top to bottom surface of the broadcast antenna arm edge and decay into photons that are transmitted in-plane and in-phase through a dielectric medium to the receiver plasmonic antenna in the far field where the photons excite surface plasmons in the receiver region, wherein the distance between the broadcast antenna arm edge and the receiver antenna arm edge is from about 2 to about 20 times the selected wavelength.

\* \* \* \* \*